United States Patent [19]

MacLeod et al.

[11] 4,253,971

[45] Mar. 3, 1981

[54] WATER TREATMENT

[76] Inventors: Norman A. MacLeod, 82 Dawn Dr., Northcliff, Transvaal; Charles P. N. Webb, 45 1st Ave., Illovo, Johannesburg, Transvaal, both of South Africa

[21] Appl. No.: 81,091

[22] Filed: Oct. 2, 1979

Related U.S. Application Data

[63] Continuation of Ser. No. 916,048, Jun. 14, 1978, abandoned.

[30] Foreign Application Priority Data

Jun. 14, 1977 [ZA] South Africa ..................... 77/3557

[51] Int. Cl.$^3$ .............................. C02F 1/72; C02F 1/50
[52] U.S. Cl. ..................................... 210/759; 210/764; 424/130
[58] Field of Search ................. 210/60, 63 R, 64, 169, 210/501; 71/67; 424/130; 162/161

[56] References Cited

U.S. PATENT DOCUMENTS

| | | | |
|---|---|---|---|
| 1,105,739 | 8/1914 | Wunsche | 424/130 |
| 1,271,611 | 7/1918 | Pickl | 424/130 |
| 3,130,124 | 4/1964 | Ferris | 210/64 |
| 3,215,627 | 11/1965 | Tools | 210/64 |
| 3,248,281 | 8/1966 | Goodenough | 424/130 |
| 3,342,674 | 9/1967 | Kowalski | 71/67 |
| 3,684,477 | 8/1972 | Blumbergs | 71/67 |
| 3,690,860 | 9/1972 | Salutsky | 162/161 |
| 3,715,309 | 2/1973 | Zumbrum | 210/63 R |
| 3,772,193 | 11/1973 | Nelli | 210/169 |
| 4,014,676 | 3/1977 | Carter | 71/67 |

FOREIGN PATENT DOCUMENTS

| | | | |
|---|---|---|---|
| 2735393 | 2/1978 | Fed. Rep. of Germany | 71/67 |
| 50-105906 | 6/1975 | Japan | 102/161 |
| 1407258 | 9/1975 | United Kingdom | 210/64 |
| 1500707 | 2/1978 | United Kingdom | 424/130 |

*Primary Examiner*—Ernest G. Therkorn
*Attorney, Agent, or Firm*—Haseltine and Lake

[57] ABSTRACT

A method of controlling pathogenic organisms, fungi and algae in water which includes the steps of applying to the water a primary reagent comprising a linear polymeric biguanide or a salt thereof which in its free base form has a recurring polymer unit represented by the formula

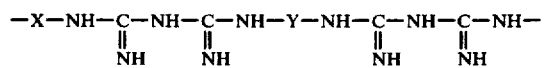

wherein X and Y represent bridging groups in which together the total number of carbon atoms directly interposed between the pairs of nitrogen atoms linked by X and Y is more than 9 and less than 17, and a back-up algicidal agent comprising a substance which in the aqueous phase produces hydrogen peroxide, preferably persalts selected from perborates, percarbonates, peroxides and persulphates.

9 Claims, No Drawings

WATER TREATMENT

This is a continuation of application Ser. No. 916,048 filed June 14, 1978, now abandoned.

BACKGROUND OF THE INVENTION

This invention relates to water treatment and particularly to the treatment of swimming pool water.

Swimming pool water is usually maintained clean and free of bacteria, fungi and algae by means of chlorination. A typical chlorination reagent is calcium hypochlorite. However the bacteria, fungi and algae become resistant to a consistent level of chlorination over a period of time and it is therefore necessary to treat the water periodically with an agent which is capable of dealing with the resistant bacteria, fungi and algae. Such an agent is known as a super-chlorination or back-up agent.

In the specification of South African Pat. No. 73/9529, the contents of which are incorporated herein by reference, there is described a method of treating water for controlling the growth of bacteria and algae in which a suitable quantity of a linear polymeric biguanide or a salt thereof which in its free base form has a recurring polymer unit represented by the formula

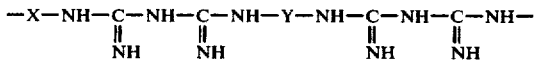

wherein X and Y represent bridging groups in which together the total number of carbon atoms directly interposed between the pairs of nitrogen atoms linked by X and Y is more than 9 and less than 17. A preferred polymeric biguanide is poly(hexamethylene biguanide) hydrochloride sold under the trade name Baquacil SB by Imperial Chemicals Industries Limited. This water treatment method has the advantage that it is completely chlorine free and has no irritant effect on the eyes. In addition no objectionable odors or tastes are produced.

In certain circumstances however which may vary greatly according to local conditions back-up treatment may be required to assist the algicidal activity of the polymeric biguanide. The problem exists however with this reagent that most of the currently available back-up agents are not compatible with this reagent and as a result chemical degradation occurs.

SUMMARY OF THE INVENTION

It is an object of the present invention to provide an improved method of treating water.

According to the invention a method of controlling pathogenic organisms, fungi and algae in water includes the steps of applying to the water a primary reagent comprising a linear polymeric biguanide or a salt thereof which in its free base form has a recurring polymer unit represented by the formula

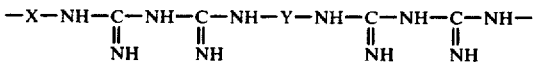

wherein X and Y represent bridging groups in which together the total number of carbon atoms directly interposed between the pairs of nitrogen atoms linked by X and Y is more than 9 and less than 17, and a back-up algicidal agent comprising a substance which in the aqueous phase produces hydrogen peroxide.

The combined treatment results in effective control of pathogenic organism, fungi and algae in the water.

DESCRIPTION OF PREFERRED EMBODIMENTS

The primary reagent may be any linear polymeric biguanide or salt thereof described in the specification S.A. Pat. No. 73/9529 and is preferably poly(hexamethylene biguanide) hydrochloride.

As described in the specification of South African Pat. No. 73/9529 the concentration of the polymeric biguanide or salt thereof in the water should preferably not be below 4 ppm, and a concentration of about 10 to 12 ppm is found to be effective, but the period for which an effective concentration is maintained depends inter alia on the climatic conditions and the number of persons using the swimming pool.

The hydrogen peroxide producing substance may be a persalt of the following type:

1. A higher oxide
2. A peroxygen compound
3. An addition compound of the form $X.Y.H_2O_2$
4. A true peroxy compound.

These compounds have similar properties but they are not easily classified in strict chemical terms.

1. Higher Oxides

The term "high" has little precision but is usually applied in those cases where an element forms well marked basic acidic or amphoteric oxides (normal oxides) and also oxides with a greater proportion of oxygen than the normal oxides. A typical example of a higher oxide is sodium peroxide.

2. Peroxygen Compounds

Potassium monopersulphate (peroxy monosulphate) is a true peroxygen compound. The standard electro potential ($E°$) is 1.44 volts. The persulphate dissociates in water to produce two electrons:

3. Addition Compounds

Sodium percarbonate is not a true persalt but an addition compound, i.e. it may be considered as $2NA_2CO_3 . 3H_2O_2$. In solution dissociation occurs into sodium carbonate and hydrogen peroxide.

4. True Peroxy Compounds

Sodium perborate is a white crystalline powder manufactured in two forms. The most widely used is known as the tetrahydrate $NaBO_3. 4H_2O$, which is often described as $NaBO_2. H_2O_2. 3H_2O$.

The second form is known as the mono-hydrate $NaBO_3. H_2O$ and may be written $NaBO_2. H_2O_2$. According to T. D. Manley (J.C.I. Jan. 6, 1962 14) the nmr spectra and electrolytic evidence points to the structure of the hydrates as being true peroxy rather than the crystalline compounds which would have been peroxyhydrates. The anhydrous perborate is different, since it evokes its oxygen in water and is probably a disubstituted peroxide.

Preferred persalts are perborates, peroxides, percarbonates and persulphates. The persalts may be in the form of any suitable salt, but are typically alkali metal or alkaline earth metal salts. Usually the salts will be sodium or potassium salts.

The preferred substance for the back-up agent is an alkali metal perborate, e.g. sodium or potassium perborate. The alkali metal perborates, particularly sodium perborate, have the advantages that they are generally freely available, inexpensive and that they have a low mammalian toxicity and a satisfactory cost/efficacy ratio.

The back-up agent may be applied to the water as a powder or in tablet form. The tablet form is preferred for the tablets are easy to handle and can be supplied as slow release tablets.

The back-up agent is generally applied to the water in such manner as to produce a concentration of hydrogen peroxide in the water of between 0.5 and 10 ppm. The amount of hydrogen peroxide producing substance necessary to produce this concentration will depend on the nature of the substance. By way of example it can be stated that where the hydrogen peroxide producing substance is an alkali metal perborate, the perborate is usually applied to the water at a dosage of between 100 to 600, preferably 200, grams per 50,000 liters of water per week.

The invention is further described in the following examples.

Two pools A and B with water volumes of 70,000 liters and 150,000 liters respectively were treated over a three month period extending from November of one year to March of the following year.

The pools were treated with a primary reagent of poly(hexamethylene biguanide) hydrochloride in the form of a 20% aqueous solution to provide a concentration of 50 ppm of the solution, that is a concentration of 10 ppm of the active ingredient, and with slow release sodium perborate tablets each having an average mass of 225 grams, on a four month cycle, as follows:

| | FOUR MONTH CYCLE | | | |
|---|---|---|---|---|
| | Amount of Biguanide Reagent | | Amount of Biguanide Reagent | |
| Pool | Tablets (liters) | Tablets | Tablets (liters) | Tablets |
| | First Month | | Second Month | |
| A | 4.75 | 5 | 2.5 | 6 |
| B | 15.0 | 12 | 8.0 | 6 |
| | Third Month | | Fourth Month | |
| A | 2.55 | 3 | 0.5 | 7 |
| B | 6.7 | 9 | 3.5 | 12 |

The analytical and microbiological observations are recorded in the accompanying table.

TABLE

| | POOL | SAMPLING DATES | | | | | | | |
|---|---|---|---|---|---|---|---|---|---|
| | | 22/11 | 29/11 | 6/12 | 13/12 | 16/1 | 7/2 | 21/2 | 7/3 |
| CHEMICAL PROPERTY | | | | | | | | | |
| Hardness Temporary as CaCO$_3$ ppm | A | 148 | 190 | 190 | 186 | 167 | 160 | 166 | 140 |
| | B | 71 | 75 | 83 | 75 | 78 | 35 | 32 | 78 |
| Hardness Permanent as CaCO$_3$ ppm | A | 64 | 68 | 66 | 62 | 62 | 40 | 42 | 36 |
| | B | 43 | 46 | 44 | 39 | 42 | 35 | 32 | 35 |
| Ammonia as N ppm | A | −0.01 | −0.01 | 0.37 | 0.65 | 1.54 | 0.9 | 0.57 | 0.74 |
| | B | 0.01 | 0.01 | 0.24 | 0.75 | 0.25 | 0.24 | 0.74 | 0.29 |
| Nitrite as NO$_2$ ppm | A | −0.05 | −0.1 | −0.1 | −0.1 | −0.1 | −0.1 | −0.1 | −0.1 |
| | B | −0.05 | −0.1 | −0.1 | −0.1 | −0.1 | −0.1 | −0.1 | −0.1 |
| Nitrite as NO$_3$ ppm | A | 8.9 | 8.4 | 10.0 | 11.0 | 9.0 | 3.5 | 4.8 | 6.7 |
| | B | 0.2 | 0.8 | 0.5 | 0.3 | 0.1 | 0.1 | 0.1 | 0.2 |
| Albuminoid Nitrogen ppm | A | 0.36 | 0.49 | 0.82 | 1.15 | 1.44 | 1.23 | 1.15 | 1.85 |
| | B | −0.01 | −0.01 | 0.49 | 0.65 | 0.82 | 0.90 | 1.07 | 1.30 |
| Boric Acid as Boron | A | −0.01 | 0.5 | 0.65 | 0.75 | 1.6 | 1.9 | 3.0 | 2.7 |
| | B | 0.3 | 0.7 | 0.75 | 1.0 | 1.1 | 1.9 | 3.7 | 2.7 |
| MICROBIOLOGICAL RESULTS | | | | | | | | | |
| Total Count (1 ml at 37° C. 24 hours) | A | 3 | 3 | 1 | 1 | 22 | 6 | 6 | 20 |
| | B | TNTC | 54 | 14 | 17 | 15 | 0 | 0 | 4 |
| Total Coliform (per 100 ml) | A | 0 | 0 | 0 | 0 | 0 | 0 | 0 | 0 |
| | B | 2 | 0 | 0 | 0 | 0 | 0 | 0 | 0 |

The tabulated results indicate that the use of the primary reagent of poly(hexamethylene biguanide) hydrochloride together with a back-up agent of sodium perborate satisfactorily controlled pathogenic organisms.

Observations to detect algal growth were made throughout the test period. The test period extended through the summer months with average temperatures varying from 21° C. to 28° C. The test pools were used extensively during the test period. Visual examination of the pools showed no evidence of algae or fungi. The chemical properties tabulated in the table indicate that the pool treatment of the invention produced no deleterious side effects.

The tablets used in the example were prepared by compressing sodium perborate powder at a pressure of approximately 5,000 kilograms per square centimeter. The rate at which the tablet dissolves in water is proportional to the compressive force used in the forming of the tablet. Alternatively the sodium perborate powder can be made into a tablet using a polyethylene glycol wax as a lubricant.

The sodium perborate tablet is safe to handle and is non-toxic and generates no smell or obnoxious fumes. It is simple to use, obviates the need for algicides which generate ammonia, and creates no harmful breakdown products in the pool. The tablet dissolves slowly and so is more effective in cleansing and in disinfecting than if the sodium perborate were released in a sudden burst.

Since the hydrogen peroxide is only released when the tablets are dissolved there are significant reductions in the hazards of handling and storage compared to the position that would result if liquid hydrogen peroxide (at commercial concentrations) were used as a back-up agent.

By experiment it has been found that the sodium perborate works particularly effectively as a back-up agent when applied to the water at a dosage of approximately 200 grams per 50,000 liters of water per week.

However in winter when the rate of algal growth diminishes a sodium perborate dosage of as low as 100 grams per 50,000 liters per week can produce satisfactory results. Conversely when a pool which is severely affected by algal growth is first treated with the method of the invention, initial shock doses of up to three times the normal dosage of sodium perborate may be required to control the situation. Thus a dosage of up to 600 grams per 50,000 liters per week may be required.

We claim:

1. A method of controlling pathogenic organisms, fungi and algae in water which comprises the steps of applying to the water a primary reagent comprising a linear polymeric biguanide or a salt thereof which in its free base form has a recurring polymer unit represented by the formula

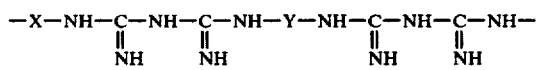

wherein X and Y represent bridging groups in which together the total number of carbon atoms directly interposed between the pairs of nitrogen atoms linked by X and Y is more than 9 and less than 17, followed by applying to the water an alkali metal perborate in tablet form to produce a back-up algicidal effect in the water, and which in the aqueous phase produces hydrogen peroxide.

2. A method according to claim 1 in which the primary reagent is poly(hexamethylene biguanide) hydrochloride.

3. A method according to claim 1 in which the primary reagent is applied to the water at a dosage of between 4 to 12 ppm.

4. A method according to claim 3 in which the dosage of the primary reagent is about 10 to 12 ppm.

5. A method according to claim 1 in which the perborate is sodium perborate.

6. A method according to claim 1 in which the tablets are slow release tablets.

7. A method according to claim 1 in which the perborate is applied to the water in such manner as to produce a concentration of hydrogen peroxide in the water of between 0.5 and 10 ppm.

8. A method according to claim 1 in which the perborate is an alkali metal perborate and is applied to the water at a dosage of between 100 to 600 grams of the hydrogen peroxide producing substance per 50,000 liters of water per week.

9. A method according to claim 8 in which the dosage is substantially 200 grams of the alkali metal perborate per 50,000 liters of water per week.

* * * * *